July 16, 1968 A. PLETENIK ET AL 3,393,335
ELASTOMERIC SPRING FOR RESTRICTING RADIAL
VIBRATION OF WINDINGS IN SLOTS
Filed Dec. 1, 1965 2 Sheets-Sheet 1
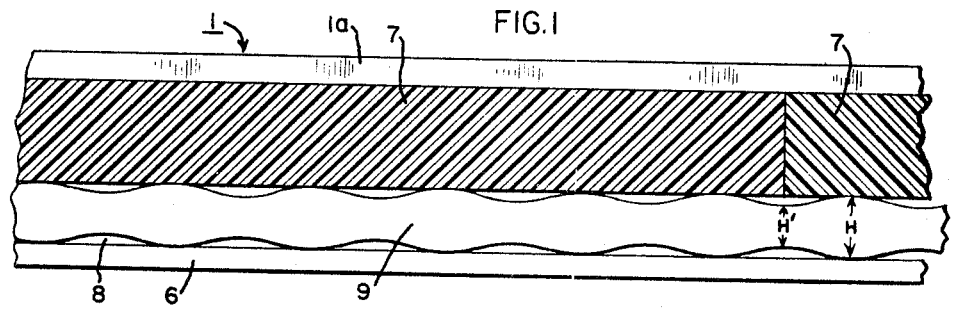
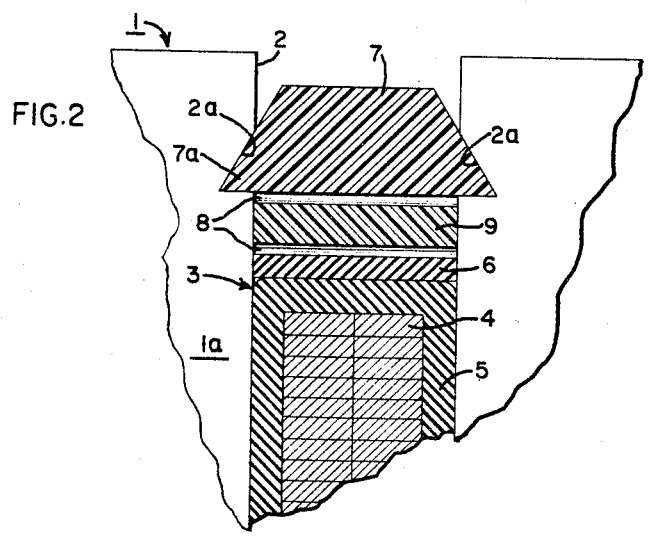
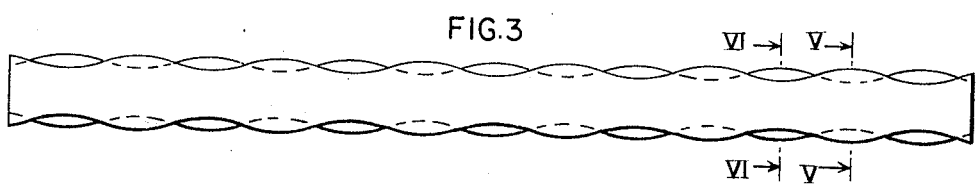
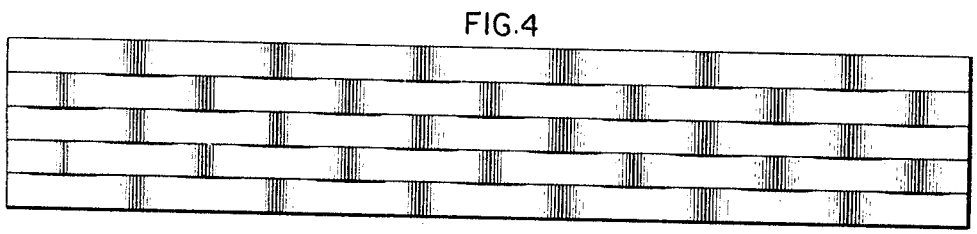
 
INVENTORS:
THOMAS R. BUTMAN, JR.
ANDREW PLETENIK,
BY  W. C. Crutcher
THEIR ATTORNEY.

July 16, 1968  A. PLETENIK ET AL  3,393,335
ELASTOMERIC SPRING FOR RESTRICTING RADIAL
VIBRATION OF WINDINGS IN SLOTS
Filed Dec. 1, 1965  2 Sheets-Sheet 2

INVENTORS:
THOMAS R. BUTMAN, JR.
ANDREW PLETENIK,
BY W. C. Crutcher
THEIR ATTORNEY.

United States Patent Office 3,393,335
Patented July 16, 1968

3,393,335
ELASTOMERIC SPRING FOR RESTRICTING
RADIAL VIBRATION OF WINDINGS IN
SLOTS
Andrew Pletenik, Schenectady, and Thomas R. Butman,
Jr., Albany, N.Y., assignors to General Electric Company, a corporation of New York
Filed Dec. 1, 1965, Ser. No. 510,782
8 Claims. (Cl. 310—214)

ABSTRACT OF THE DISCLOSURE

Compressible member composed of elastomeric material inserted between a conductor and a stationary support member to absorb vibrations of the conductor. Member has undulating cross section.

---

This invention relates to a slot wedge assembly for a dynamoelectric machine. More particularly, it relates to an improved elastomeric member for use in such a slot wedge assembly for retaining winding elements within the radial winding slots of a dynamoelectric machine stator.

In the armature or stator of a dynamoelectric machine such as a generator, the conductors are placed in longitudinal slots in the stator core. The conductors are then held in the slots by dovetailed pieces or wedges which serve as retaining members. These wedges may or may not be tight when assembled and the stresses, shrinkages, distortions, and vibrations that result from operation tend to loosen the conductors within the slots. It is thus desirable that there be some resilient means between the wedges and their respective conductors to provide a compression or biasing to restrict movement of the insulated conductors so as to prevent damage, and to take up any looseness in the fit of the wedges over the conductors.

Prior suggestions as, for example, disclosed in British Patent No. 758,964, have included spring members of insulating material. These are generally of uniform thickness and are shaped so as to provide resiliency by bending rather than from elastomeric compressibility. Due to their relative hardness, abrasion has been experienced in some cases. Elastomeric substances have been proposed in uniform solid or hollow shapes as, for example, in German Patent No. 666,339, but these either have insufficient follow-up or do not provide sufficient allowance for size variations of the space between the conductor and the wedge.

Accordingly, an object of this invention is to provide an improved resilient means for restricting vibration in dynamoelectric machine armature conductors by maintaining a radial force on the winding.

Another object is to provide an improved resilient means for taking up looseness in the fit of the wedges over the conductors in a dynamoelectric machine.

Other objects, advantages and features of this invention will become apparent from the following detailed description taken in connection with the accompanying drawing.

Briefly stated, the essence of this invention is an elastomeric material in compression between a dynamoelectric machine stator wedge and a conductor, the elastomeric material having a cross section which repeatedly varies in radial thickness so as to be capable of exerting substantial radial force and yet having enough follow-up to compensate for changes in radial dimensions between wedge and conductor.

In the drawing:

FIG. 1 is a longitudinal cross section of the resilient means of this invention as it appears in the stator slot of a dynamoelectric machine.

FIG. 2 is a transverse cross section of the elements shown in FIG. 1.

FIGS. 3 and 4 are elevation and top views respectively of another form of the resilient means of this invention.

FIGS. 5 and 6 are sectional views taken along lines V—V and VI—VI respectively of FIG. 3.

Figure 7:
FIGS. 7 and 8 are elevation and top views respectively of three other forms of the resilient means of this invention.

Referring now to FIGS. 1 and 2, a magnetic core structure 1 such as the stator core of a dynamoelectric machine, is comprised of laminations 1a which have been punched and aligned to form a longitudinally extending slot 2. Disposed in slot 2 is in insulated conductor 3 which, for example, may consist of lightly insulated strands 4 surrounded by a heavy layer of ground insulation 5. A filler strip 6 of insulating material is disposed in the slot 2 on top of conductor 3. Extending along slot 2 are a series of abutting retaining members or wedges 7, arranged to slide axially in slot 2 by means of dovetail portions 7a on either side of the wedges which fit in dovetail grooves 2a along the slot 2. The lower surfaces of wedges 7 are spaced from filler strip 6 and a clearance or space 8 exists therebetween.

Disposed in the space 8 between wedges 7 and filler strip 6 is a resilient strip 9 of elastomeric material having a periodic or cyclical wavy or rippled configuration. The cross section of the strip 9 varies in radial thickness from a value of H at the crown of the ripples to a lower value H' at the root section of the ripples. At its thickest points, the resilient means 9 contacts and is compressed between the wedge 7 and the filler strip 6. Though the drawing shows relatively pronounced configurations of the crowns and roots of strip 9, it will be understood that this is primarily for illustration. In reality, strip 9 will be flatter than as shown.

In operation, when electromagnetic forces and heat cause the conductors 3 to strain within their slots, the resultant change in the clearance 8 is taken up by the resilient means 9. If the clearance is lessened, the resilient means being compressed will become relatively flattened out, the elastomeric material being forced to accommodate itself in the spaces or voids between it and the wedge or filler strip which result from the rippled configuration. In other words, the elastomeric material being compressed in one direction, must expand in another direction and room for such expansion is present due to the rippled shape of the strip. Such longitudinal bulging is independent in each cycle and not cumulative. That is, the lengthening effect of the bulging is not additive along the strip 9. If the clearance is enlarged, the resilient means will expand and continue to press against the wedge and the filler strip so as to continue to provide effective radial load.

The material of which resilient means 9 is composed must be able to provide a restoring force when compressed for long periods of time at generator operating temperature. That is, it must be of an elastic or elastomeric, as distinguished from a plastic, nature. It must be capable of maintaining its elastomeric properties while being subject to substantially permanent stresses at an elevated temperature. Such a material, and the presently preferred material for this use, is SE (Silicone Elastomer) 412 manufactured by General Electric Company. This material shows high resistance to creep. When tested under constant load of 100 p.s.i. at 100° C. for 7500 hours, a sample originally 379 mils thick returned to 367 mils thickness. The material was tested for compression set by being compressed to a fixed displacement for 6000 hours, at which time the two samples provided a restoring force of 43% of the initial load values of 100 and 200 p.s.i. respectively.

Several modifications of the present invention are shown in FIGS. 3–13. FIGS. 3–6 show a ripple shape of the same general type as the one shown in FIG. 1. In effect, it is a plurality of rippled strips placed longitudinally side by side, each being offset by one-half wave length from the adjacent strip. This is clearly shown in FIGS. 5 and 6. Actually, this strip is a single piece.

Figure 8:
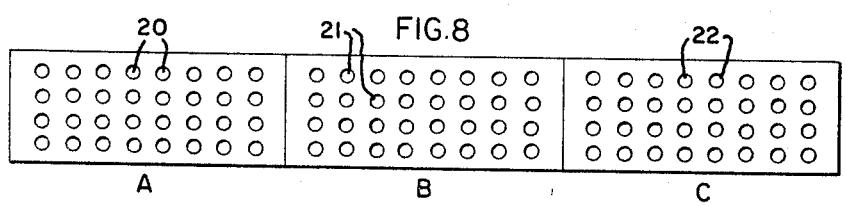

FIGS. 7 and 8 show flat strips of the elastomeric material from which material has been removed to accommodate the bulging which occurs when the strip is compressed. Portions A, B, C show alternate arrangements. In the view labeled A, cylindrical holes 20 are shown cut straight through the strip. Holes 20 can of course be round, square, or oval in any configuration, number, and spacing. In the view labeled B, blind cylindrical holes 21 are shown cut into the strip. These are of variable size, depth, and spacing and may be opposed or offset. In the view labeled C, dimple shaped impressions 22 in the strip are shown and may be of any size, depth, configuration, and spacing, and may be opposed or offset.

Figure 9:
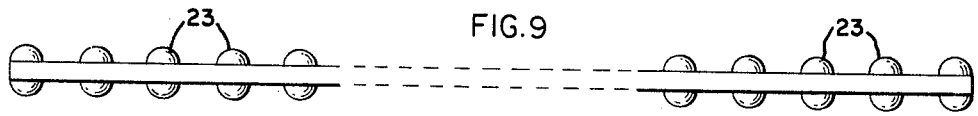
FIGS. 9 and 10 are elevation and top views respectively of another form of the resilient means of this invention.
Figure 10:
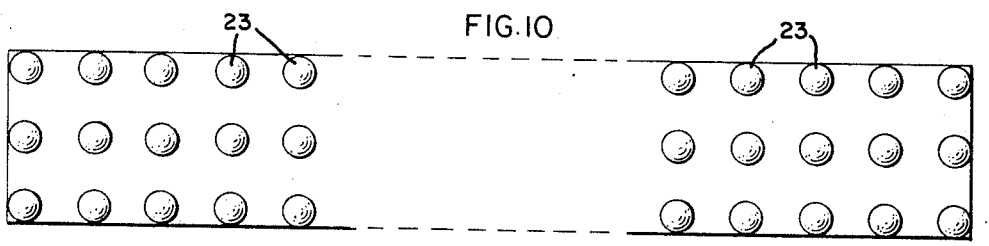
Figure 11:
FIGS. 11, 12 and 13 are perspective views of additional raised shapes constituting alternative forms of the FIGS. 9 and 10 embodiment of this invention.
Figure 12:
Figure 13:

FIGS. 9–13 show, on a flat strip of the elastomeric material, raised elements 23 for the purpose of accommodating the bulging between them. FIG. 9 shows raised elements that are substantially hemispherical. FIG. 11 shows an example of a prismatic raised element. FIG. 12 shows a cylindrical raised element and FIG. 13 shows a block shaped element raised from the flat strip.

The operation of all these modifications is the same, the essential consideration being to allow room for compression bulging by providing an elastomeric strip which varies in radial thickness along its length so as not to occupy the entire volume of the clearance between wedges 7 and filler strip 6. All modifications show configurations which an elastomeric spring could take for the purpose of making best use of its resilient properties. The selection among all the forms shown will depend on other factors such as tear resistance, abrasion resistance, stress concentration, etc. In view of these considerations, the elastomeric strips of FIGS. 1 and 3 are presently perferred.

Thus it will be apparent that a resilent means has been provided for maintaining radial force against and thus restricting vibration of the conductors of dynamoelectric machine stators. The resilient means of this invention is capable of heavy duty under conditions of pressure and temperature exceeding those to be found in the operation of a large dynamoelectric machine.

It will occur to others of ordinary skill in the art to make modifications of this invention which will remain within the concept and scope thereof and will not constitute departure therefrom. Therefore, it is desired that this invention be not limited by the details in which it has been described but that it encompasses all within the purview of the following claims.

What is claimed is:

1. The combination of: an insulated conductor disposed longitudinally in an open slot, a conductor retaining means longitudinally disposed in said slot and spaced from said conductor, an elastomeric resilient means disposed within the space between said conductor and said retaining means, and in discontinuous abutting relation with said conductor and said retaining means, said elastomeric resilient means having a cyclical pattern of varying thicknesses along its length so as to define periodic voids in said space with said conductor and said retaining means to allow independent expansion of each cycle as the resilient means is compressed between said conductor and said retaining means.

2. The combination of claim 1 in which said elastomeric resilient means comprises a strip having an alternately convex and concave wavy surface along its length.

3. The combination of claim 1 in which said elastomeric resilient means comprises a substantially flat strip with spaced concavities therein.

4. The combination of claim 1 in which said elastomeric resilient means comprises spaced convexities projecting from a substantially flat strip.

5. A dynamoelectric machine having insulated conductor bars mounted therein and including longitudinal slots containing said conductor bars, conductor bar retaining means longitudinally disposed in said slots, and spaced from said conductor bars, elastomeric resilient means disposed within the spaces between said conductor bars and said retaining means, and in discontinuous abutting relation with said conductor bars and said retaining means, said elastomeric spring means having a cyclical pattern of varying thicknesses along its length so as to define periodic voids in said spaces to allow independent expansion of each cycle as the resilient means are compressed between said conductor bars and said retaining means.

6. The combination of claim 5 in which said elastomeric resilient means comprises a strip having an alternately convex and concave wavy surface along its length.

7. The combination of claim 5 in which said elastomeric resilient means comprises a substantially flat strip with spaced concavities therein.

8. The combination of claim 5 in which said elastomeric resilient means comprises spaced convexities projecting from a substantially flat strip.

References Cited

UNITED STATES PATENTS

| | | | |
|---|---|---|---|
| 2,922,058 | 1/1960 | Bacon | 310—214 |
| 3,093,764 | 6/1663 | King | 310—214 |
| 3,243,622 | 3/1966 | Whittlesey | 310—214 |

MILTON O. HIRSHFIELD, *Primary Examiner.*

R. W. TEMPLETON, *Assistant Examiner.*